April 28, 1936. W. THOMPSON 2,038,863
TRAILER TRUCK
Filed April 1, 1935 2 Sheets-Sheet 2
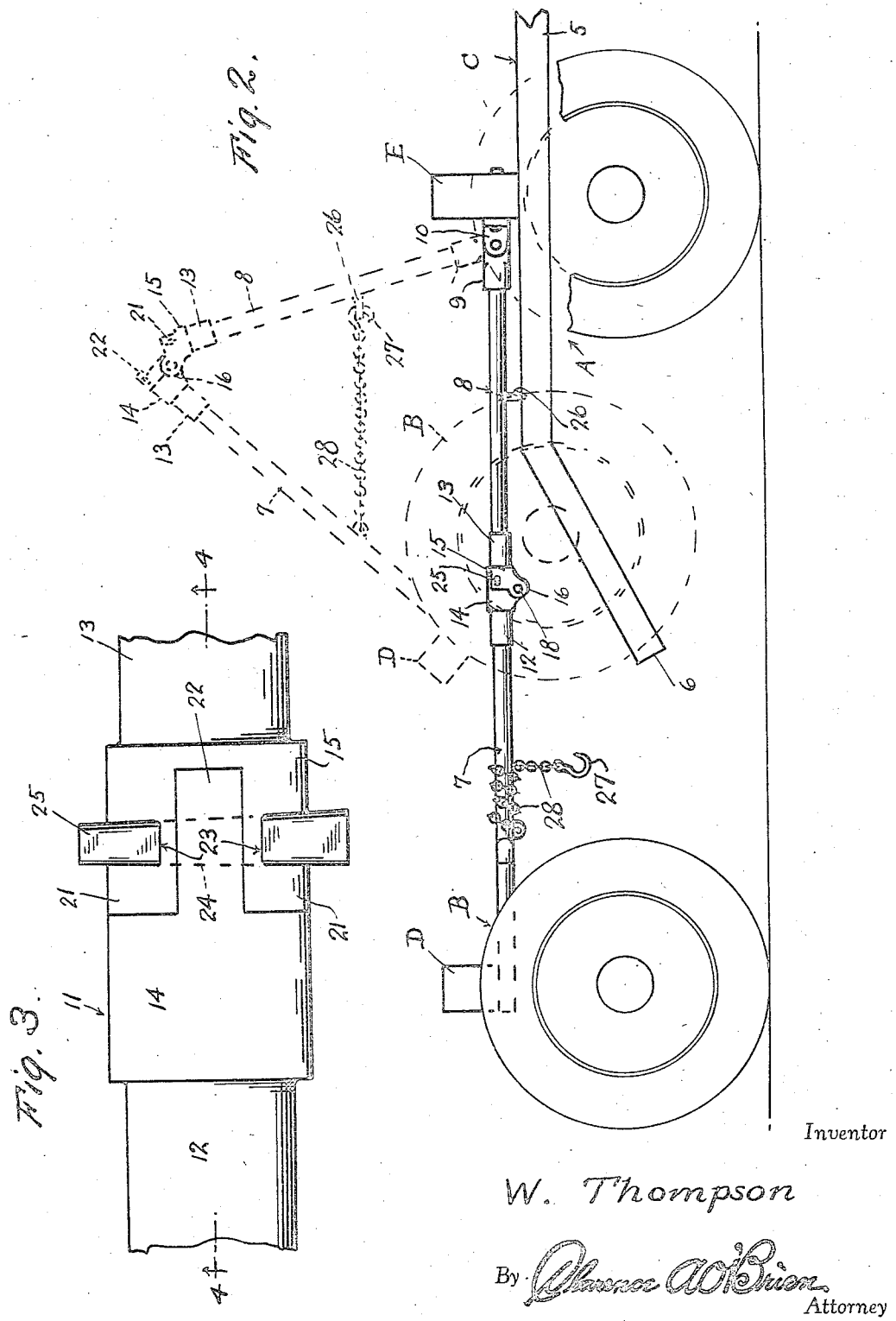
Inventor
W. Thompson
By *Lawrence A. O'Brien*
Attorney Patented Apr. 28, 1936

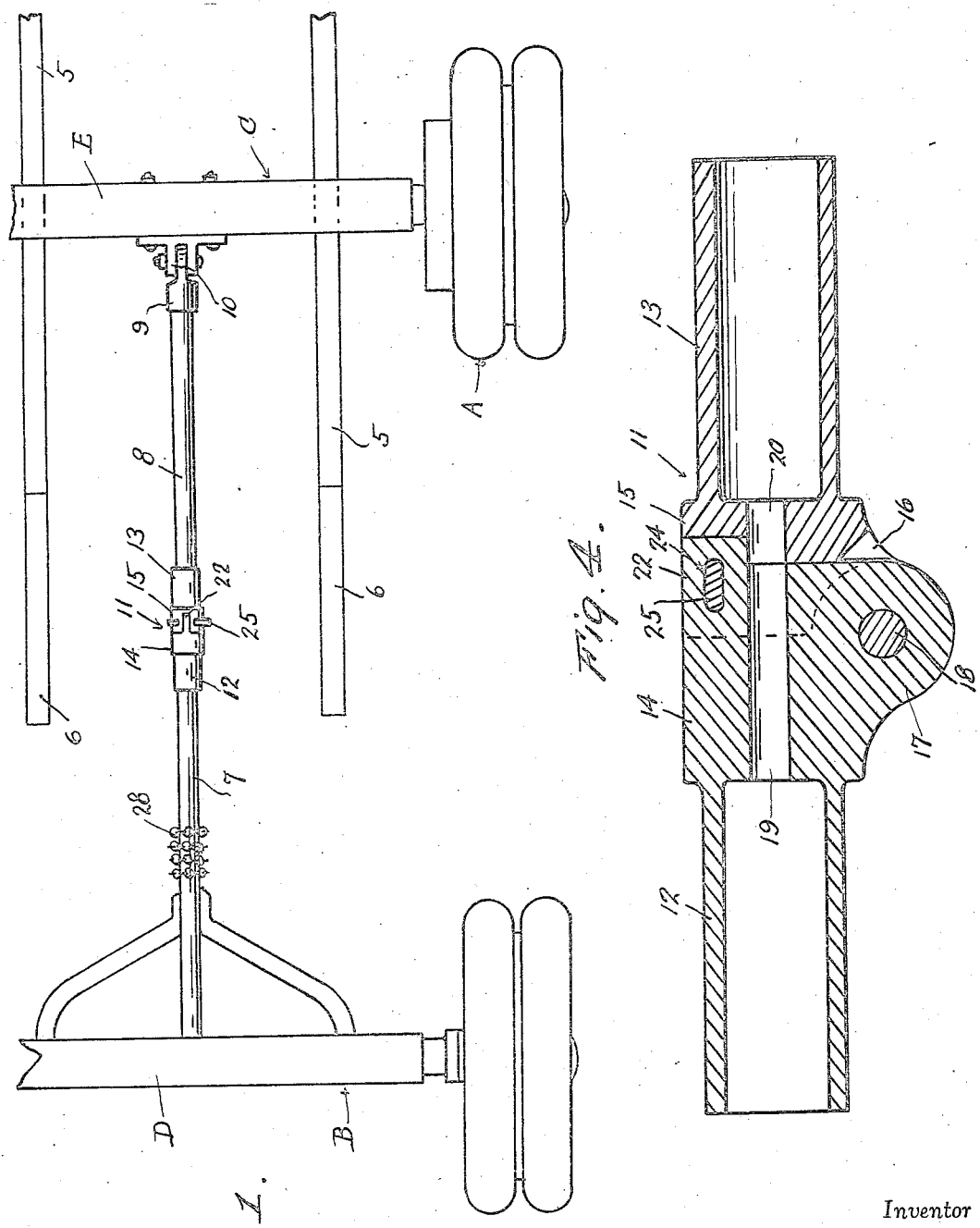

2,038,863

UNITED STATES PATENT OFFICE 2,038,863

TRAILER TRUCK

William Thompson, La Grande, Oreg., assignor of one-half to Earl Sagar, La Grande, Oreg.

Application April 1, 1935, Serial No. 14,169

1 Claim. (Cl. 214—65)

This invention relates to a transportation vehicle or conveyance which may be unitarily referred to as a trailer truck, and the conception involves an arrangement whereby the trailer is so attached to the lead vehicle or truck proper as to permit said trailer to be bodily swung and lifted up on the chassis of the truck for more convenient handling and hauling.

The invention has reference in particular to a truck of the character or type used in the logging industry. In this line of endeavor, as well as elsewhere, it is frequently desirable as a matter of convenience and compactness to actually load the trailer on the truck in order to decrease the longitudinal dimension of the structure as a whole and to facilitate carriage and hauling with the attendant advantages derived from this method of handling the trailer when it is not in use.

Broadly the desired results are attained through the instrumentality of a simple and economical arrangement whereby the trailer is operatively joined to the truck by way of a shaft made up of hinged sections, the arrangement and coordination being such that, without detaching the trailer, it may be bodily hoisted, shoved onto the chassis or frame of the truck and hauled about from place to place in such contracted, out-of-the-way position.

Other features and advantages may be reflected from the illustrative drawings and the explanatory description thereof.

In the drawings wherein like numerals are employed to designate corresponding parts throughout the views:

Figure 1 is a diagrammatic top plan view of the truck and trailer combination showing the improved draft and jointing means between these parts.

Figure 2 is a view in side elevation showing the parts in operative positions in full lines, and showing the trailer hoisted up to its folded out-of-the-way position in readiness to be loaded on the truck, in dotted line position.

Figure 3 is an exaggerated detail view of the coupling means per se.

Figure 4 is a longitudinal section taken approximately on the plane of the line 4—4 of Figure 3.

In the drawings, in Figure 2 for example, the truck is denoted as a unit by the letter A, while the trailer is distinguished by the letter B. The chassis or frame of the truck is indicated at C and the characters D and E represent transverse risers such as are used for log tying and loading purposes. The trailer is a simple two-wheel assembly and is of conventional design. The rails or side members of the truck frame are, however, revised to accomplish the desired results. That is, the rails 5 have their rear extended ends 6 directed downwardly in spaced parallelism to function as runners or tracks on which the axle of the trailer rides up from the position shown in full lines to the position shown in dotted lines in Figure 2. The truck can if desired, be lifted completely up on the horizontal portion of the frame by this arrangement and through the instrumentality of the improved jointing and draft shaft. As a general rule the shaft is in the nature of a pipe or pole. In the present arrangement, it is made up of a pair of companion sections distinguished by the numerals 7 and 8 respectively. The part 8 is joined by way of the connecting fixtures 9 and 10 to the cross piece E. At this point is a hinged connection so as to allow this part 8 to swing up or down as desired. The complemental part 7 is attached at its rear end rigidly by way of a yoke or the like to the cross piece D. The inner adjacent ends are coupled together through the medium of a practical hinge device. The improved coupling is denoted as a unit by the numeral 11. As shown in particular in Figure 4, it comprises a pair of tubular sockets 12 and 13 which serve to receive the adjacent ends of the pipe sections or parts 7 and 8. The jointed ends are in the nature of complemental heads 14 and 15, the head 15 having a pair of depending ears 16 between which the connecting lug 17 is arranged and fastened by a pivot pin 18. If desired, the heads may be bored as indicated at 19 and 20. This provides the desired hinge joint between the coupling sections. In addition, however, it will be observed that the head 15 is bifurcated and that the furcations 21 serve to define a keeper between which the tenon or extension 22 on the head 14 swings. In addition these features are provided with passages 23 and 24 which register as shown in Figure 3 to accommodate a removable wedge shaped retaining pin 25. Thus the parts may be securely locked together to form a single unitary shaft during the ordinary trailer operating period. When it is desired not to use the trailer, the pin 25 is removed and the joint between the parts 7 and 8 is broken upwardly as indicated in dotted lines in Figure 2. This allows the trailer to approach the truck A and to ride up on the runners 6 and to be lodged or seated on the rear end portion 5 of the frame. That is to say, this double hinge action at the forward end of the shaft as well as at its center permits this bodily lifting and loading of the trailer B on the truck A. The advantages and features which accrue from this arrangement need not be described explicitly for persons skilled in the art to which the invention relates will no doubt readily appreciate the invention.

When the structure is in the collapsed or folded state illustrated in dotted lines in Figure 2 it is evident that it is desirable to provide some means for maintaining it so. Under the circumstances I found it expedient and practicable to simply provide the part 8 with an apertured lug 26 which functions as a keeper for a free leaf pivoted hook 27 on the free end or terminal of a connecting chain 28. The chain 28 is securely anchored at its opposite end on the intermediate portion of the complemental section 7. The use and special adaptation of this chain connecting means is quite obvious and a more elaborate description is unnecessary. It may be mentioned however that some other means may be employed as a connection between the parts 7 and 8 to accomplish the same result.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

Having thus described the invention, what is claimed as new is:

In combination, a trailer truck including a housing having a shaft therein, wheels mounted on said shaft, a truck including a wheeled supported frame having its rear end portion bent downwardly, a sectional shaft, one section of the shaft being rigidly joined to the trailer, the forward section being hingedly joined to the truck, the adjacent ends of said two sections being hingedly connected together, and provided with an interlocking tongue and groove connection, said interlocking tongue and groove connection having registering apertures therein, a removable pin insertable in said apertures for locking the adjacent ends of said two sections together, to permit the trailer to be pulled behind the truck under normal working conditions, said sections being foldable upon removing said pin, to permit said trailer truck housing to be loaded and rest on the downwardly bent rear end portions of said truck when not in use.

WILLIAM THOMPSON.